United States Patent
Fong

(10) Patent No.: US 12,217,086 B2
(45) Date of Patent: Feb. 4, 2025

(54) CHAIN SCHEDULE MANAGEMENT FOR MACHINE LEARNING MODEL-BASED PROCESSING IN COMPUTING ENVIRONMENT

(71) Applicant: Dell Products L.P., Round Rock, TX (US)

(72) Inventor: Victor Fong, Melrose, MA (US)

(73) Assignee: Dell Products L.P., Round Rock, TX (US)

( * ) Notice: Subject to any disclaimer, the term of this patent is extended or adjusted under 35 U.S.C. 154(b) by 426 days.

(21) Appl. No.: 17/681,309

(22) Filed: Feb. 25, 2022

(65) Prior Publication Data

US 2023/0273814 A1    Aug. 31, 2023

(51) Int. Cl.
  *G06F 9/48*   (2006.01)
  *G06N 20/00*  (2019.01)

(52) U.S. Cl.
  CPC ........... *G06F 9/4881* (2013.01); *G06N 20/00* (2019.01)

(58) Field of Classification Search
  CPC .................................................. G06F 9/4881
  See application file for complete search history.

(56) References Cited

U.S. PATENT DOCUMENTS 11,720,408 B2 * 8/2023 Sivaraman ............. G06N 20/00
                                                    718/104

OTHER PUBLICATIONS

L. Wang et al., "Peeking Behind the Curtains of Serverless Platforms," USENIX Annual Technical Conference, Jul. 2018, 13 pages.
F. Romero et al., "INFaaS: Automated Model-less Inference Serving," USENIX Annual Technical Conference, Jul. 2021, 15, pages.
Wikipedia, "Edge Computing," https://en.wikipedia.org/w/index.php?title=Edge_computing&oldid=1073476548, Feb. 22, 2022, 7 pages.
The Kubernetes Authors, "Cluster Architecture," https://kubernetes.io/docs/concepts/architecture/_print/, Accessed Feb. 25, 2022, 23 pages.

* cited by examiner

*Primary Examiner* — Charlie Sun
(74) *Attorney, Agent, or Firm* — Ryan, Mason & Lewis, LLP

(57) ABSTRACT

Techniques are disclosed for chain schedule management for machine learning model-based processing in a computing environment. For example, a method receives a machine learning model-based request and determines a scheduling decision for execution of the machine learning model-based request. Determination of the scheduling decision comprises utilizing a set of one or more scheduling algorithms and comparing results of at least a portion of the set of one or more scheduling algorithms to identify execution environments of a computing environment in which the machine learning model-based request is to be executed. The identified execution environments may then be managed to execute the machine learning model-based request.

20 Claims, 12 Drawing Sheets

800

| Model | Size | Cluster |
|---|---|---|
| Model-1 | Large | Cluster-1 |
| Model-1 | Large | Cluster-2 |
| Model-1 | Medium | Cluster-2 |
| ... | ... | ... |

```
generate_children(parent):
    children = []
    for f in functions:
        for c in clusters:
            for m in model_instances:
                if c.incapable(m):
                    continue
                s = parent.create_child_state(f, c, m)
                if s in solved_state:
                    continue
                children.append(s)
    calculate_scores(children)
    add_to_solved_states(children)
    add_to_sorted_queue(children)
```

FIG. 9

CHAIN SCHEDULE MANAGEMENT FOR MACHINE LEARNING MODEL-BASED PROCESSING IN COMPUTING ENVIRONMENT

FIELD

The field relates generally to information processing, and more particularly to management of information processing systems.

BACKGROUND

Machine learning (ML) application programs and microservices utilize ML models, which typically have a training mode and an inference mode. In the training mode, model parameters (sometimes also referred to as model hyperparameters) of the ML model are adjusted to optimize for accuracy. Once the ML model is trained with acceptable accuracy, it can then be used for the inference mode. The inference mode is the process of entering new input to the trained ML model, which then generates and outputs a prediction based on one or more pre-defined computations using the optimized parameters. This inference mode process is also referred to as inference serving. While inference serving using a trained ML model typically consumes fewer virtualized computing resources (e.g., containers, virtual machines, and the like) than the training mode, schedule management of model execution on the virtualized computing resources can pose significant technical problems depending on the computing environment in which the inference serving functionality is deployed.

SUMMARY

Embodiments provide techniques for chain schedule management for machine learning model-based processing in a computing environment.

For example, in one illustrative embodiment, a method receives a machine learning model-based request and determines a scheduling decision for execution of the machine learning model-based request. Determination of the scheduling decision comprises utilizing a set of one or more scheduling algorithms and comparing results of at least a portion of the set of one or more scheduling algorithms to identify execution environments of a computing environment in which the machine learning model-based request is to be executed. The identified execution environments may then be managed to execute the machine learning model-based request.

While techniques described herein are particularly well-suited for inference serving in an edge computing environment, embodiments are not limited thereto.

These and other illustrative embodiments include, without limitation, methods, apparatus, networks, systems and processor-readable storage media.

BRIEF DESCRIPTION OF THE DRAWINGS

FIG. 8 illustrates a model-cluster lookup map for use in an inter-cluster scheduler with chain scheduling functionality according to an illustrative embodiment.

FIG. 9 illustrates pseudo-code for state generation for use in an inter-cluster scheduler with chain scheduling functionality according to an illustrative embodiment.

DETAILED DESCRIPTION

Figure 1:
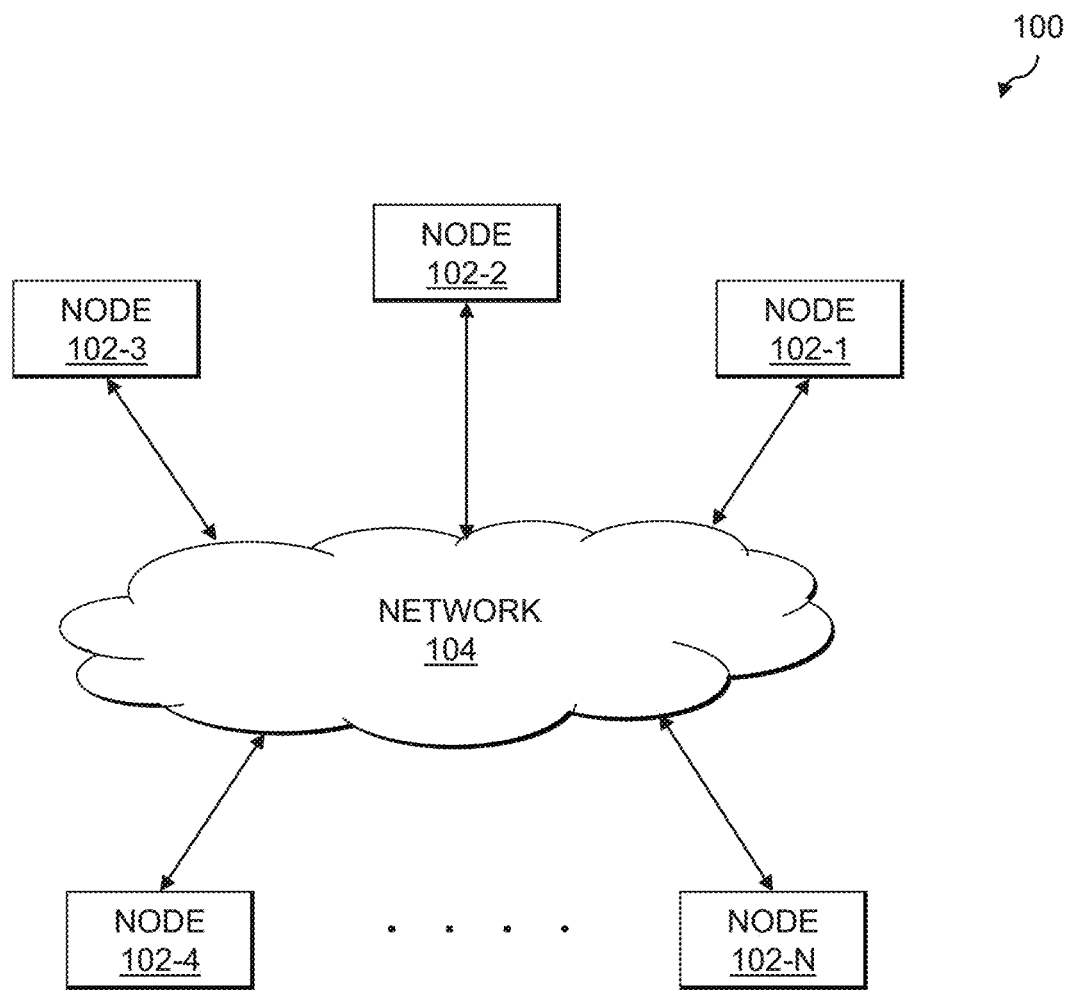
FIG. 1 illustrates a computing environment within which one or more illustrative embodiments can be implemented.

As mentioned, schedule management (e.g., scheduling and placement) of model execution on virtualized computing resources (e.g., containers, virtual machines, and the like) can pose significant technical problems depending on the computing environment in which inference serving functionality for an ML model is deployed. Currently, there are standards for defining ML models, computations and parameters in pre-defined file formats (e.g., Open Neural Network Exchange or ONNX), so that ML models of varied sizes can be processed in similar manners. As further mentioned above, inference serving refers to the process of accepting input, performing an inference computation based on the input, and responding with a computation result. It is realized herein that, aside from pre-processing input data, the core implementation of inference serving can be re-used for different applications and microservices. However, existing approaches for ML model processing have their own technical shortcomings, as will be explained below.

For example, consider a Function-as-a-Service (FaaS) execution environment for ML model processing, where FaaS workloads or functions are typically short-lived with the ability to scale down to zero instances. The lifecycle of a function can be measured in seconds. Some implementations have maximum execution times, e.g., about two minutes. These workloads are executed in isolated containers which are subject to cold-start times. Cold-start time refers to the time it takes to allocate and start the container from scratch, as will be further explained below.

Further, Inference-as-a-Service (INFaaS) refers to ML inference serving platforms that can provide a model-less experience to users, based on user-defined requirements such as accuracy, performance, and cost. However, current INFaaS platforms are cloud-based (i.e., implemented on a cloud computing platform) and do not take into account workload scheduling dimensions associated with edge computing platforms which can include heterogeneous execution environments, latencies, model transmissions, bandwidths, etc.

As is known, edge computing is a distributed computing paradigm wherein data computation and/or data storage is performed at or close to a location where the data is produced. This is in comparison to cloud or core computing paradigms wherein data computation and/or data storage is performed at a more centralized location (e.g., data center) that is not necessarily at or close to the data source.

Still further, ML models such as deep neural network (DNN) models are available in different sizes (even ones with the same objective), i.e., different numbers of layers and parameters. There are several mechanisms to compress DNN models to reduce their sizes. DNN models of larger sizes require more computing resources and take longer to perform inference serving, but have greater accuracy over smaller-sized models. Model compression is typically a trade-off between size and accuracy.

It is further realized herein that, with the significant increase in the implementation of the edge computing paradigm, potential execution locations of workloads increase to the range of millions. The tasks of manually configuring and managing millions of heterogeneous execution environments is unrealistic and developers would not be able to do that for each microservice and function created.

Illustrative embodiments overcome the above and other technical problems associated with existing ML processing approaches by providing a cluster-less, server-less, and model-less INFaaS platform that can be used in computing environments including, but not limited to, edge, cloud, and core computing environments. Such a computing platform enables, inter alia, developers and data scientists to deploy new ML models or existing ML models, and specify execution requirements and service level agreements. Advantageously, the INFaaS platform is configured to select the appropriate ML model and execution environment.

Note that the terms server-less, model-less and cluster-less do not necessarily mean that servers, models and clusters (i.e., groups of computing nodes used to execute one or more workloads) are not used to execute a given application or microservice. Rather, the respective terms generally mean that a developer or data scientist need not be concerned with scaling of servers, models and clusters since those features are automatically or at least semi-automatically managed (abstracted) by the computing platform upon which the application or microservice is developed and/or deployed.

It is realized herein that illustrative embodiments overcome many technical problems attributable to implementing an INFaaS platform with cluster-less, server-less and model-less characteristics. More particularly, illustrative embodiments described herein provide techniques for selecting model and execution environments based on many different variables. While edge scheduling is generally a significant technical problem, INFaaS introduces additional challenges with model selection and heterogeneous execution environments. Furthermore, the characteristics of DNN inference workloads also provide additional motivation for optimizations, as will be further explained herein.

In addition to basic service level agreement (SLA) dimensions for cluster-less edge computation (such as, but not limited to, accuracy, cost, performance, latency, bandwidth, etc.), edge INFaaS also introduces additional dimensions including, but not limited to, model selection and model compression.

The accuracy of each model impacts a scheduling decision, as some environments lack sufficient computing resources to execute larger models. The model selection further impacts cost and performance, as larger models require more computing resources, resulting in higher costs. Large models also have longer execution times and typically take longer to download into the execution environment, resulting in increased performance overhead.

In addition, it is further realized herein that inference serving may sometimes involve use cases wherein an inference function needs to execute in conjunction with one or more other functions, services, and/or microservices, e.g., illustratively referred to herein as an "inference chain," "function chain," or simply "chain." Thus, for some larger use cases that include multiple services, microservices and/or functions, scheduling that focuses on a single inference execution is not suitable for satisfying end-to-end SLA dimensions in a given computing environment. These and other technical considerations will be further explained after an illustrative computing environment is described below.

Referring initially to FIG. 1, a computing environment 100 is depicted within which one or more illustrative embodiments can be implemented. As generally shown, a plurality of nodes 102-1, 102-2, 102-3, 102-4, ..., 102-N (which may hereinafter be referred to collectively as nodes 102, and individually as node 102) are operatively coupled to one another via a network 104.

In some embodiments, computing environment 100 may be an exemplary information processing system with associated computers, servers, storage devices and other processing or computing devices. Each node 102 may be one or more of the above types of processing or computing devices. It is to be appreciated, however, that embodiments are not restricted to use with any particular system and/or device configurations. Accordingly, the term "information processing system" as used herein is intended to be broadly construed, so as to encompass, for example, processing systems comprising computing and storage systems, as well as other types of processing systems comprising various combinations of physical and virtual processing resources.

For example, an information processing system may comprise at least one data center or other type of cloud-based system that includes one or more clouds hosting tenants that access cloud resources. Such a system may also be referred to as a core system. Alternatively, an information processing center may comprise an edge-based system that includes one or more edge computing platforms with edge devices and/or edge gateways that operate in accordance with an edge computing paradigm. Still further, embodiments may comprise a combination of cloud/core-based devices and edge-based devices, and/or other types of computing devices. Nodes 102 in computing environment 100 are intended to represent any one or more of the types of devices illustratively mentioned above, as well as other types of devices.

For example, nodes 102 may comprise client devices, e.g., physical computing devices such as Internet of Things (IoT) devices, mobile telephones, laptop computers, tablet computers, desktop computers or other types of devices utilized by members of an enterprise, in any combination. Such devices are examples of what are more generally referred to herein as processing devices. Some of these processing devices are also generally referred to herein as computers or computing devices. The client devices may also or alternately comprise virtualized computing resources, such as virtual machines (VMs), containers, etc. The client devices in some embodiments comprise respective computers associated with a particular company, organization or other enterprise. In addition, at least portions of computing environment 100 may also be referred to herein as collectively comprising an enterprise. Numerous other operating scenarios involving a wide variety of different types and arrangements of processing nodes are possible, as will be appreciated by those skilled in the art.

Still further, nodes 102 may comprise mini-computers. A mini-computer may be implemented as a single-board computer (SBC), a computer-on-module (COM) or system on a module (SOM), an embedded computer system, a system on chip (SoC), a system in a package (SiP), an integrated circuit, a hardware accelerator, etc. A mini-computer illustratively has its own processor and memory space, and is capable of executing an operating system (OS) in a stand-alone fashion (e.g., separate from a host OS that runs or executes on a client device).

Nodes 102 may take on various form factors. For example, in some embodiments, nodes 102 may be implemented as embedded components of client devices. In other embodiments, nodes 102 may be implemented as external pluggable devices. In still other embodiments, some client devices may be configured with embedded functionalities of nodes 102 while other client devices are connected to external pluggable components with functionalities of nodes 102.

In addition, nodes 102 may comprise one or more servers, gateways, or other types of devices forming systems including, but not limited to, edge computing platforms, cloud infrastructure comprising one or more clouds (e.g., one or more public clouds, one or more private clouds, one or more hybrid clouds, combinations thereof, etc.), and/or core computing platforms.

The network 104 may be implemented using multiple networks of different types. For example, the network 104 may comprise a portion of a global computer network such as the Internet, although other types of networks can be part of the network 104 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 104 in some embodiments therefore comprises combinations of multiple different types of networks each comprising processing devices configured to communicate using Internet Protocol (IP) or other related communication protocols.

The term "user" herein is intended to be broadly construed so as to encompass numerous arrangements of human, hardware, software or firmware entities, as well as combinations of such entities.

Although not explicitly shown in FIG. 1, one or more input-output devices such as keyboards, displays or other types of input-output devices may be used to support one or more user interfaces to nodes 102, as well as to support communication between nodes 102 and other related systems and devices not explicitly shown. Further, at least portions of the functionality of nodes 102 may be implemented at least in part in the form of software that is stored in memory and executed by a processor.

Nodes 102 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Nodes 102 may be implemented on respective distinct processing platforms, although numerous other arrangements are possible. For example, in some embodiments at least portions of nodes 102 are implemented on the same processing platform, while others of nodes 102 are implemented on other processing platforms.

The term "processing platform" as used herein is intended to be broadly construed so as to encompass, by way of illustration and without limitation, multiple sets of processing devices and one or more associated storage systems that are configured to communicate over one or more networks. For example, distributed implementations of nodes 102 are possible, in which certain ones of nodes 102 reside in a first geographic location while other ones of nodes 102 reside in at least a second geographic location that is potentially remote from the first geographic location. Numerous other distributed implementations of nodes 102 are possible.

Additional examples of processing platforms utilized to implement portions of computing environment 100 in illustrative embodiments will be described in more detail below in conjunction with FIGS. 12 and 13.

It is to be understood that the particular functionalities of nodes 102 are presented by way of illustrative example only and, in other embodiments, additional or alternative functionalities may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

By way of further example, in one illustrative embodiment, nodes 102 may be nodes in a container orchestration platform such as, but not limited to, a Kubernetes framework. Kubernetes is an open-source system for automating application deployment, scaling, and management within a container-based information processing system comprised of components referred to as pods, nodes and clusters, as will be further explained below in the context of FIG. 2. Types of containers that may be implemented or otherwise adapted within the Kubernetes system include, but are not limited to, Docker containers or other types of Linux containers (LXCs) or Windows containers. Kubernetes has become a prevalent container orchestration system for managing containerized workloads. It is rapidly being adopted by many enterprise-based information technology (IT) organizations to deploy their application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster (i.e., a group of worker nodes wherein each worker nodes executes one or more pods/containers). A Kubernetes cluster is managed by a least one manager or administrator node. A Kubernetes environment may include multiple clusters respectively managed by one or more administrator nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

While a Kubernetes framework is illustratively described above, it is to be appreciated that alternative embodiments are not limited to any particular container orchestration system. That is, while descriptions of subsequent figures refer to worker nodes and administrator nodes, it is to be understood that these terms are intended to generally refer to any processing or computing devices, physical and/or virtual, and not necessarily limited to the meanings given to them in the context of Kubernetes or other conventional container orchestration frameworks.

Accordingly, as will be further explained herein, illustrative embodiments provide automated orchestration techniques for executing inference chains across multiple clusters implemented by nodes 102 in computing environment 100 of FIG. 1.

Figure 2:
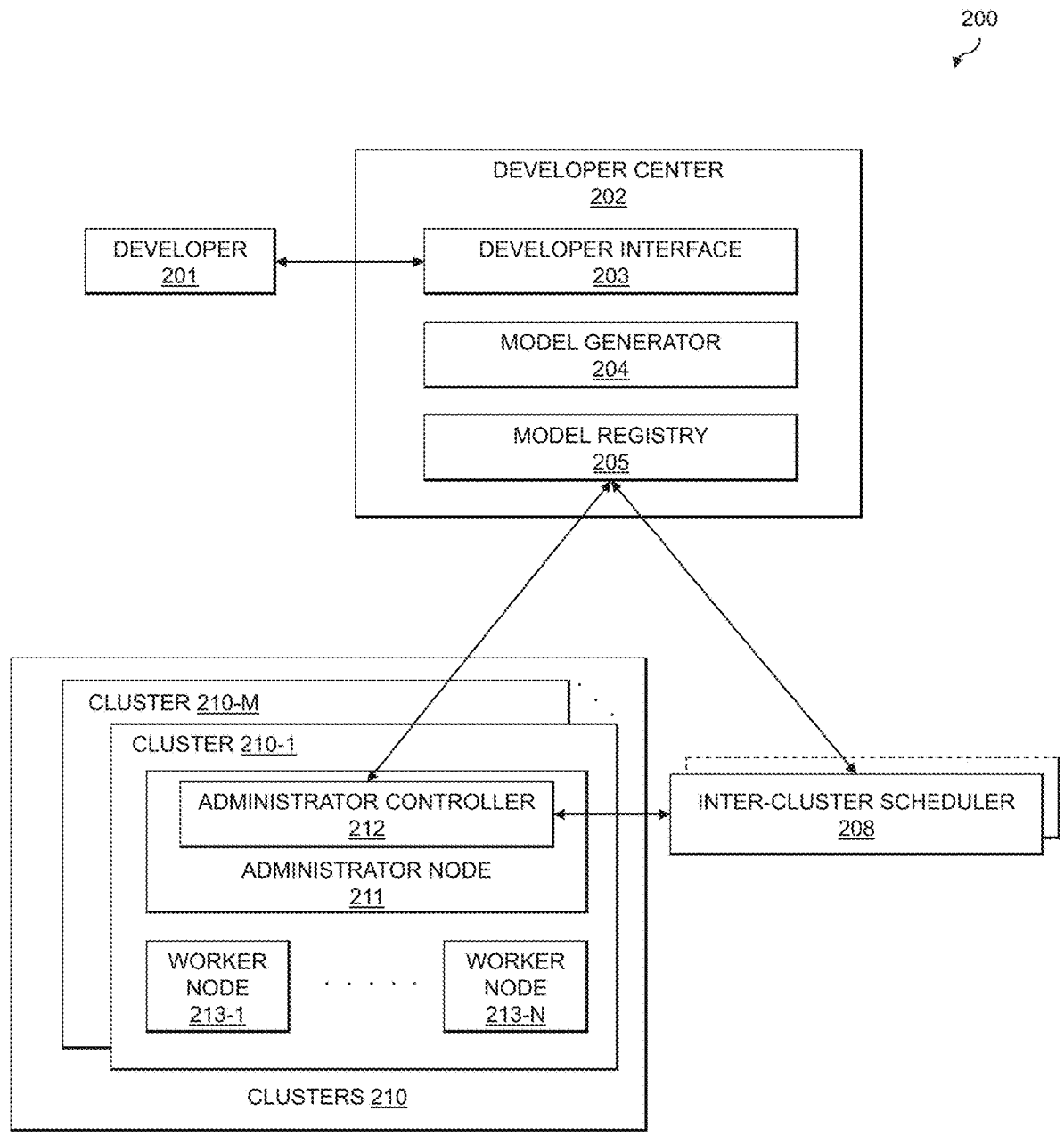
FIG. 2 illustrates an orchestration architecture configured to enable inter-cluster schedule management with chain scheduling functionality for machine learning inference serving according to an illustrative embodiment.

Turning now to FIG. 2, an orchestration architecture 200 configured to enable inter-cluster schedule management with chain scheduling functionality for machine learning inference serving is depicted according to an illustrative embodiment. Note that components shown in FIG. 2 can be implemented by one or more of nodes 102 of FIG. 1. Further, while a container is the virtualized computing resource being managed in this illustrative embodiment, it is to be understood that other types of virtualized computing resources can be managed in alternative embodiments. Note that while the definition of the term cluster as illustratively used herein may comprise a Kubernetes cluster, the term is intended to have a broader meaning and is not limited to Kubernetes or any other particular container orchestration platform.

More particularly, as shown, orchestration architecture 200 enables a developer 201 to access a developer center 202 which comprises a developer interface 203, a model generator 204, and a model registry 205. Orchestration architecture 200 further comprises an inter-cluster scheduler 208 operatively coupled to model registry 205. As will be further explained herein, inter-cluster scheduler 208 is configured with chain scheduling functionality in accordance with illustrative embodiments. It is to be appreciated that, in a distributed implementation, there can be multiple instances of inter-cluster scheduler 208 as denoted by the dashed box behind inter-cluster schedule 208 in FIG. 2. Still further, orchestration architecture 200 comprises a plurality of clusters 210 including clusters 210-1, . . . , 210-M (hereinafter collectively referred to as clusters 210 and individually as cluster 210). Each of clusters 210 comprises an administrator node 211, with an administrator controller 212, and a plurality of worker nodes 213-1, . . . , 213-N (hereinafter collectively referred to as worker nodes 213 and individually as worker node 213). Administrator controller 212 is operatively coupled to model registry 205 and to inter-cluster scheduler 208. In one or more illustrative embodiments, orchestration architecture 200 is part of an INFaaS platform implemented within an edge computing environment.

It is to be understood that other connections between components/nodes in FIG. 2 exist but are not expressly shown as they are within the understanding of one of ordinary skill in the art and/or otherwise further explained herein. Further, it is to be understood that in a Kubernetes implementation, FIG. 2 components labeled cluster, administrator node, and worker node are configured with Kubernetes functionalities described herein and/or otherwise known. Functionalities and interrelationships between FIG. 2 components will now be further explained.

In one or more illustrative embodiments, developer center 202 is a centralized processing environment for ML-based application/microservice developers, e.g., developer 201, using developer interface 203 to, inter alia, access model generator 204 and model registry 205.

Developer interface 203 is configured to enable developer 201 to use INFaaS functionalities. More particularly, developer 201 uses developer interface 203 to create one or more inference instances. For example, to create one or more inference instances, developer 201 specifies two types of input to developer interface 203: (i) the ML model or models to be used in the inference serving; and (ii) service level agreement criteria (SLA metrics) for the inference serving. For each inference instance, developer 201 can select a well-known model from an existing model catalog or other model source, or upload its own custom model. If developer 201 uploads its own custom model, the custom model should be in a format supported by the INFaaS platform.

Developer 201 then selects SLA metrics based on desired use cases. There are many different types of SLA metrics, but three useful metrics are performance, cost, and accuracy. Other SLA metrics comprise bandwidth, geographical restrictions (for policy and compliance), and compression for storage. Default metric values can be set in some embodiments so that developer 201 does not have to specify every SLA detail and can rather focus on specifying and/or adjusting the ones more critical for a particular use case. For example, a default minimum accuracy metric of 70% could be set and developer 201 can change that criterion if so desired.

As mentioned, developer 201 can select models from an existing model catalog, which may be uploaded by one or more vendors in some embodiments. When using these models, vendors who upload them are able to charge using a billing model configured on a per-usage basis (e.g., based on the number of inference instances) and/or a per-time-period basis (e.g., based on a time-subscribed parameter). Some mechanisms of model compression require re-training a new model, which also requires a training dataset. When vendors are uploading their models, the training dataset can also be uploaded for re-training purposes.

Model generator 204 is configured to compress models (i.e., generate compressed models) from an existing model catalog and/or user-uploaded models into different sizes. Models with smaller sizes typically have lower accuracy. In one or more illustrative embodiments, model generator 204 utilizes structured pruning and quantization to reduce the size of a model. In some embodiments, model generator 204 utilizes automations to auto-compress models by testing different compression algorithms and searching for optimized hyperparameters. Depending on implementation of the existing model catalog, there can be different standardized model sizes. After compression, each model is stored in model registry 205. Model generator 204 is also configured to execute inferences of different models on different hardware to benchmark performance.

Model registry 205 stores original and compressed models of different sizes from different vendors and users. Further, model registry 205 provides unique uniform resource locators (URLs) for downloading these models and provides authentication and authorization functionalities.

It is to be appreciated that, in an INFaaS platform, there can be millions of clusters across a large geographical location. Thus, in orchestration architecture 200, there can be millions of clusters 210 (clusters 210-1, . . . , 210-M as shown). The inference has a potential to execute in all of clusters 210 or in one or more subsets of clusters 210. Accordingly, the scheduling problem can be extremely complex.

Still further, as mentioned above, developer 201 may specify an inference use case wherein an inference function of a given ML model needs to execute in conjunction with one or more other functions, services, and/or microservices of the same ML model or some other ML model. This type of use case may be referred to as a function chain, an inference chain, or simply, a chain.

In such a chain use case, additional technical complexity is introduced by the nature of an INFaaS platform being implemented in an edge computing environment. More particularly, this additional technical complexity may be at least in part due to accuracy and restriction of resource availability across heterogeneous execution environments. Other restrictions may include service limitations (e.g., some clusters 210 may not be available at all times) and data gravity (e.g., some data used for the inference serving may be limited in availability to some clusters 210). These latter restrictions may render some functions, services, and/or microservices capable of execution in only a limited number of execution environments (i.e., clusters 210), causing additional technical complexity with respect to chain schedule management.

Figure 3:
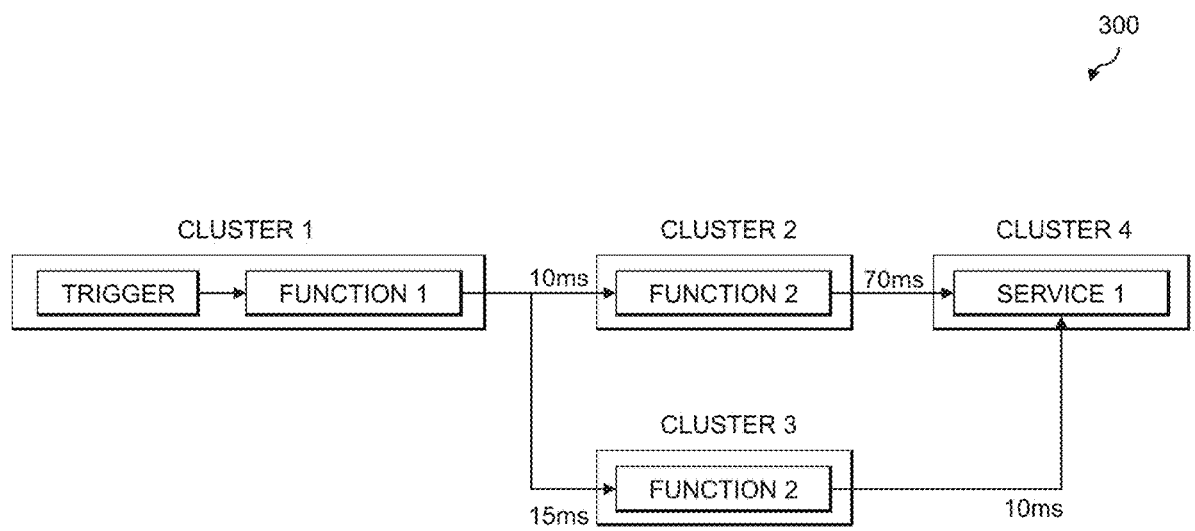
FIG. 3 illustrates an example of an inference chain across multiple clusters according to an illustrative embodiment.

FIG. 3 illustrates a inference chain example 300 that illustrates at least some scheduling complexities associated therewith. In inference chain example 300, assume that Service 1 in Cluster 4 cannot be orchestrated to another cluster due to one or more restrictions (e.g., service limitation, data gravity, etc.). If each function were scheduled individually, Function 2 would be orchestrated to Cluster 2, because the latency between Cluster 1 and Cluster 2 (10 milliseconds (ms)) would be lower compared to the latency between Cluster 1 and Cluster 3 (15 ms). However, as shown, the latency between Cluster 2 and Cluster 4 (70 ms) is much worse than the latency between Cluster 3 and Cluster 4 (10 ms). Thus, it is realized herein that the logical placement decision when trying to satisfy an end-to-end performance SLA (from Function 1 to Service 1) would be to place Function 2 at Cluster 3.

Furthermore, adding to the above technical problems is the realization that execution time for inference functions in an edge computing environment must be low, typically within about ms. This time restriction greatly limits the sophistication of any scheduling algorithms, since complex searches for optimization cannot be executed in a timely manner. As a result, in conventional scheduling approaches, implementations use algorithms (such as reinforcement agent or greedy algorithms, to name a few) that may not fully satisfy end-to-end SLA metrics.

It is further realized herein that, given the variety of possible inference use cases, there may not be any single inter-cluster scheduling algorithm that would yield a desired result (e.g., satisfactory result, reasonable result, optimal result, or otherwise useful result, etc.) in the shortest amount of time for every use case. While linear programming can likely yield an optimal result (by trying out most, if not all, possibilities), it takes an extremely long time to compute. Greedy-based algorithms can yield a reasonable result quickly, but may not always yield a result that can satisfy each user-defined SLA metric.

Based on different runtime characteristics of inference chains and environmental variables (such as, e.g., latency, bandwidth, resource availability, etc.), different implementations of algorithms may have different benefits and performance results. Thus, it is technically difficult to create one single algorithm to satisfy all use cases across all execution environments.

Illustrative embodiments overcome the above and other technical drawbacks associated with conventional scheduling approaches by providing chain scheduling functionality that, inter alia, accounts for end-to-end metrics when scheduling execution of workloads (functions) of an inference chain for placement across multiple clusters in a given computing environment.

Figure 4:
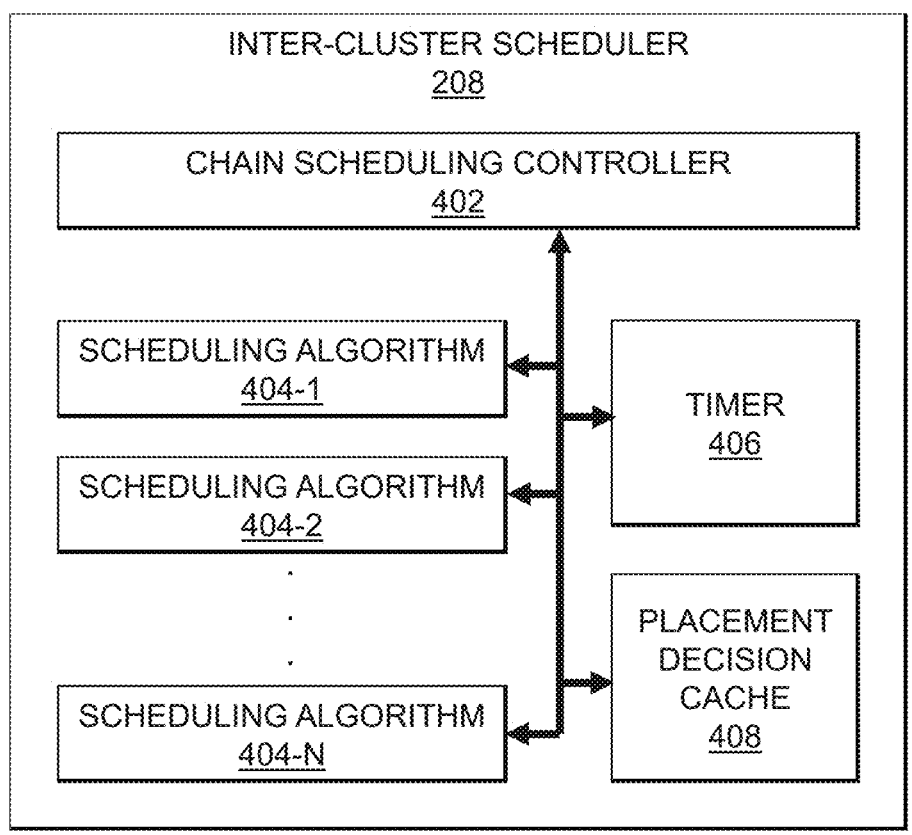
FIG. 4 illustrates an architecture for use in an inter-cluster scheduler with chain scheduling functionality according to an illustrative embodiment.

FIG. 4 illustrates an architecture 400 for inter-cluster scheduler 208 of FIG. 2 according to one illustrative embodiment. As shown, inter-cluster scheduler 208 comprises a chain scheduling controller 402, a plurality of scheduling algorithms 404-1, 404-2, . . . , 404-N (hereinafter referred to collectively as scheduling algorithms 404 and individually as scheduling algorithm 404), a timer module 406, and a placement decision cache 408. In this illustrative embodiment, upon receipt of an inference request that necessitates chain-based scheduling across multiple clusters 210 (FIG. 2), instead of inter-cluster scheduler 208 exclusively using a single scheduling algorithm, scheduling algorithms 404 are executed in parallel. The multiple scheduling algorithms 404 communicate with chain scheduling controller 402 based on timer module 406. That is, timer module 406 manages a set of time-marks that control when scheduling algorithms 404 provide scheduling results (i.e., placement plans) to chain scheduling controller 402. A placement decision is then made by chain scheduling controller 402 based on a score comparison of placement results from scheduling algorithms 404 received at or about different time-marks, and then stored in placement decision cache 408.

Figure 5:
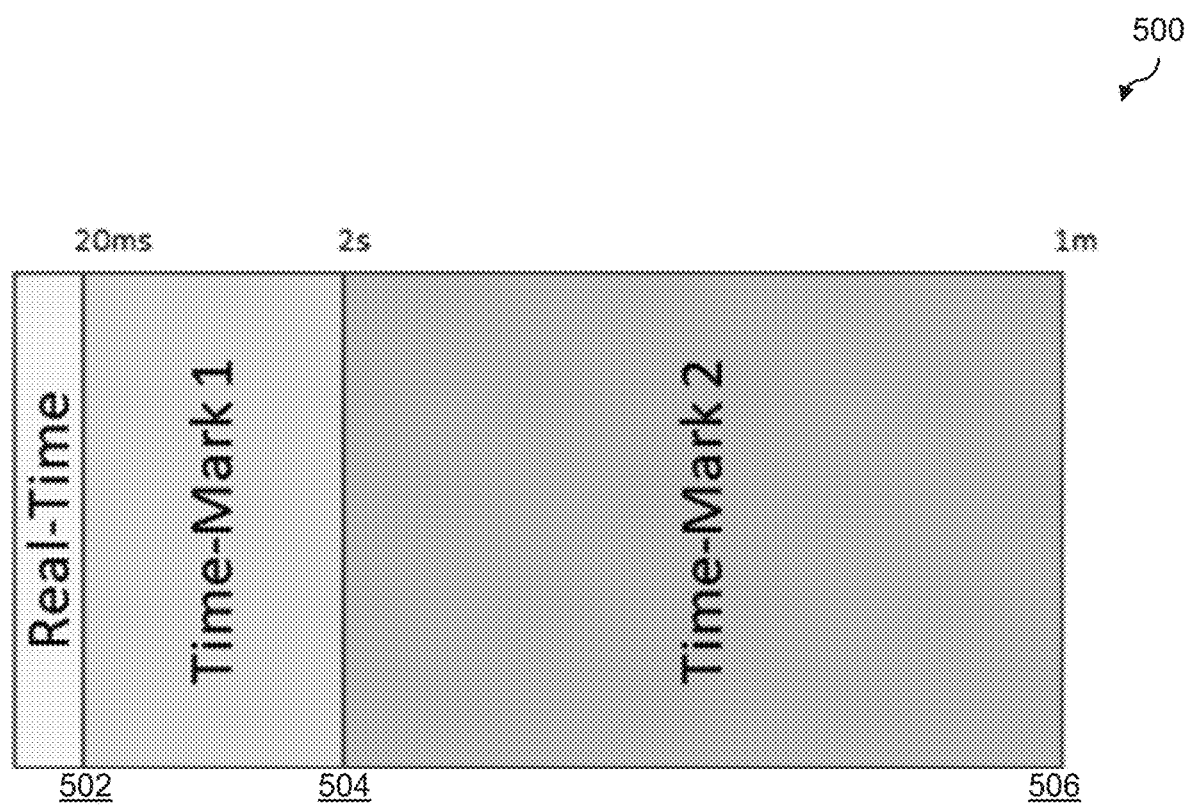
FIG. 5 illustrates a set of time-marks for use in an inter-cluster scheduler with chain scheduling functionality according to an illustrative embodiment.

FIG. 5 illustrates a set of time-marks 500 managed by timer module 406 according to an illustrative embodiment. A first time-mark 502, shown as real-time (RT) time-mark, is set to a relatively short duration, e.g., at or about 20 ms from the start of execution of scheduling algorithms 404. When first time-mark 502 is reached, each scheduling algorithm 404 returns a placement plan with combinations of clusters 210 for function placements associated with the inference chain. Scheduling algorithms 404 continue to execute after first time-mark 502 across additional multiple time-marks, i.e., second time-mark 504 (at or about 2 seconds (s)) and third time-mark 506 (at or about 1 minute (m)), wherein at each of second and third time-marks 504 and 506, scheduling algorithms 404 again return placement plans. When the placement plan received at or about each subsequent time-mark 504 and 506 is different from the placement plan stored in placement decision cache 408, chain scheduling controller 402 can update placement decision cache 408 with an updated placement plan. Corresponding ML models (functions) can then be pre-downloaded to target clusters 210 (clusters 210 specified in a placement plan) to further improve execution of the inference chain, so that model download time will not impact the performance. It is to be appreciated that the number of time-marks, their set points, and their frequencies are dependent on the particular microservice implementation and computing environment configuration, and thus embodiments are not limited to any particular set of time-marks.

Chain scheduling controller 402 then causes orchestration of the functions of the inference chain at clusters 210 (FIG. 2) that are indicated in the placement decisions stored in placement decision cache 408. Advantageously, for a given cluster 210 at which inter-cluster scheduler 208 is implemented (recall that, in some embodiments, one or more clusters 210 may be configured with an instance of inter-cluster scheduler 208), the content of placement decision cache 408 may be uploaded to one or more other clusters 210, while ML models (functions) that are to be executed at clusters 210 in accordance with placement decision cache 408 can be downloaded from model registry 205 (FIG. 2) to further reduce execution time.

Thus, unlike conventional scheduling approaches where placement is independently evaluated one execution environment at a time, a search in accordance with illustrative embodiments evaluates end-to-end metrics and calculates an overall score for each placement plan.

In one or more illustrative embodiments, inter-cluster scheduler 208 can implement a best-first-search algorithm as at least one of the plurality of scheduling algorithms 404. In general, a best-first-search is a search algorithm which makes use of a heuristic to rank nodes based on the estimated cost from that node to a goal. A heuristic is a technique designed for solving a technical problem more quickly when classic methods are too slow or for finding an approximate technical solution when classic methods fail to find any exact technical solution. Thus, in a best-first-search algorithm, the initial state is placed in a first list, then it is checked for goal conditions. If it is not a goal state, it is removed from the first list, and its child states (children) are placed in the first list. The heuristic is applied to these child states, and the state that is estimated to be the best is then taken out of the first list and evaluated. If it is not a goal state, the state is placed in a second list, its children are placed in the first list, and the heuristic is used to select the state in the first list that now appears to be the best in the first list. This continues until a goal state is found or the first list is empty.

Figure 6:
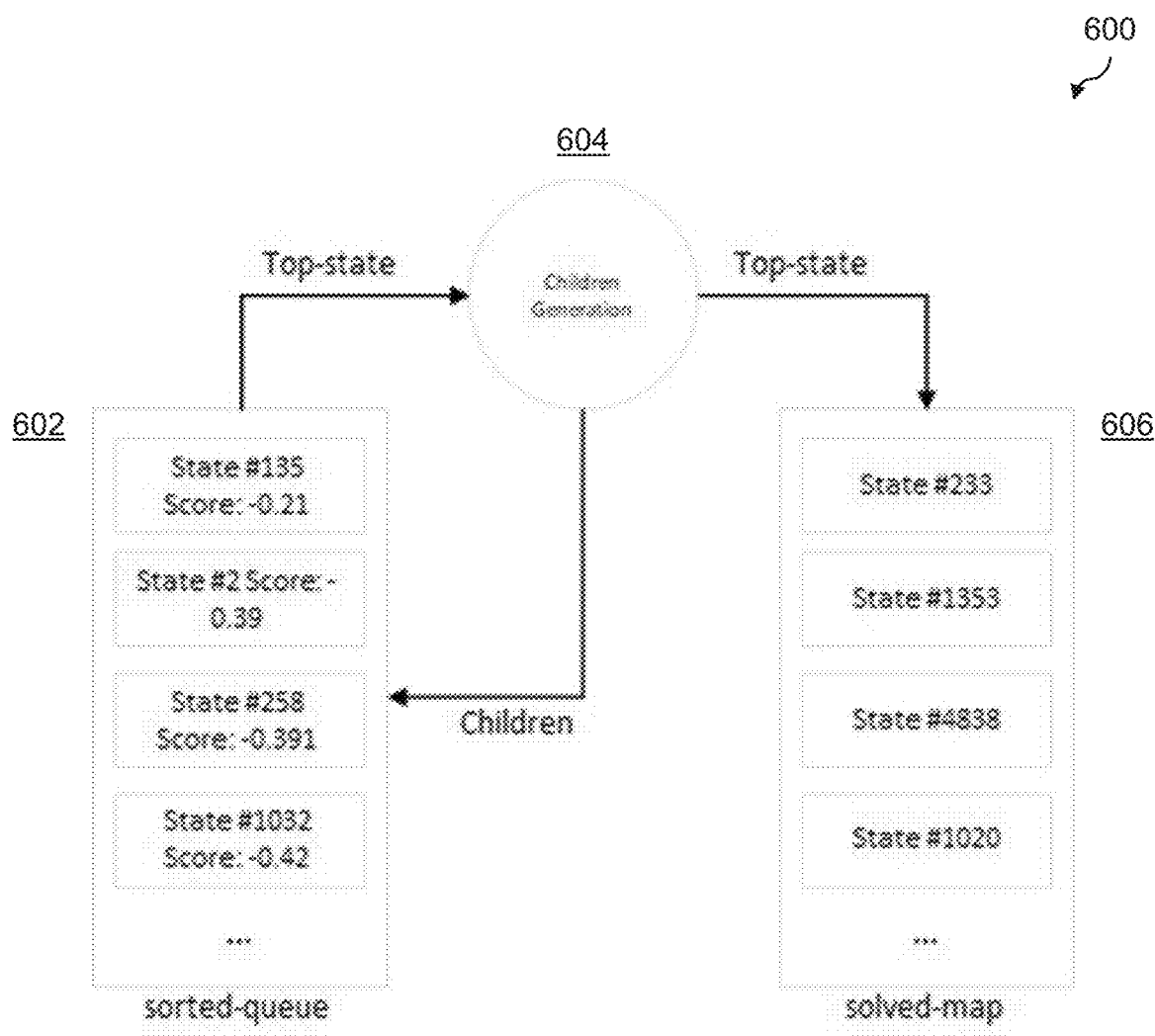
FIG. 6 illustrates a best-first-search algorithm for use in an inter-cluster scheduler with chain scheduling functionality according to an illustrative embodiment.

FIG. 6 illustrates an example of a best-first-search implementation 600 according to an illustrative embodiment. As shown, best-first-search implementation 600 comprises a sorted-queue 602, a children generation module 604, and a solved-map 606. As mentioned, these data structures and module can be implemented as part of at least one of scheduling algorithms 404 in architecture 400 for inter-cluster scheduler 208.

The initial state (which can be generated, in some embodiments, by a greedy algorithm) is inserted into sorted-queue 602. For each iteration, child states (children) are generated in children generation module 604 by changing one variable. The number of child states generated depends on the variation of variables. A score is calculated for each child state and child states are sorted in sorted-queue 602, as shown. In the next iteration, the state with the best score is dequeued from sorted-queue 602 for children generation in children generation module 604.

Figure 7:
FIG. 7 illustrates examples of state generation for use in an inter-cluster scheduler with chain scheduling functionality according to an illustrative embodiment.

By way of example only, FIG. 7 illustrates an example 700 of state generation according to best-first-search implementation 600. When searching for placement, it is to be understood that each state contains an end-to-end placement, i.e., the set of clusters 210 at which the multiple functions of the inference chain are proposed to be placed for execution. Note that MS in FIG. 7 refers to a microservice, e.g., MS-1, MS-2, MS-3 and MS-4, wherein some microservices have multiple functions associated therewith, e.g., MS-2 has three functions denoted as MS-2(1/3), MS-2(2/3) and MS-2(3/3), and some microservices have one function, e.g., MS-1, MS-3 and MS-4 each have one function respectively denoted as MS-1(1/1), MS-3(1/1) and MS-4(1/1). Each function is proposed to be placed at a separate execution environment in the end-to-end placement. Thus, in FIG. 7, state 702 represents an end-to-end placement, while state 704 is a child state of state 702 wherein one variable is changed, in this case, the proposed placement of MS-3(1/1) changes from a general purpose processor in Cluster-4 in state 702 to an accelerator in state 704. A score is calculated for each state (i.e., score 712 for state 702, and score 714 for state 704) based on a scoring criteria and weight (examples of which are explained below).

Note that each placement plan generated by scheduling algorithms 404 in FIG. 4 can be scored in this manner, an alternative manner, or some combination thereof, and comparatively evaluated by chain scheduling controller 402 to make placement decisions which are then stored in placement decision cache 408. For example, in some embodiments, each function/cluster combination in a given placement plan can be scored and compared to scores of function/cluster combinations in the same placement plan or a different placement plan, wherein each placement plan may be generated by one or more of scheduling algorithms 404.

Note further that for each inference function in the chain, clusters 210 that are incapable of executing models of specific sizes based on an accuracy SLA metric defined by a user (e.g., developer 201) should be eliminated. An in-memory map can be maintained by chain scheduling controller 402 of the clusters incapable of running specific models, e.g., a model-cluster lookup map 800 as shown in FIG. 8.

Thus, for each combination of cluster and model instance throughout the inference chain, child states are generated. FIG. 9 illustrates pseudo-code 900 for child state generation according to one illustrative embodiment. As mentioned above, child state scores are calculated which, in some embodiments, can be done in a batch mode. A hash value may be computed (using a conventional hash function) for each state to avoid duplication, and the hash values are added as solved states to solved-map 606.

To comparatively evaluate different placement plans generated by one of scheduling algorithms 404, or by different scheduling algorithms 404, chain scheduling controller 402 utilizes one or more scoring functions. In accordance with an illustrative embodiment, a scoring function takes cost and performance into account, along with other factors depending on implementation. Furthermore, users (e.g., developers 201) are able to define other criteria, such as weights for cost and performance.

In one illustrative embodiment, a cost function is expressed as:

$$\text{cost} = \Sigma_{k=0}^{n} t_k r_k v_k + c$$

where n is the number of functions within an inference chain, t is the number of times to execute each function on a specific environment, r is the resource consumed, and v is the cost per resource consumed per time, and c is a one-time cost for improvement (e.g., optimization).

In one illustrative embodiment, a performance function is expressed as:

$$perf = \Sigma_{k=0}^{n}(l_{(k-1,k)} + t_k)$$

where l is the latency between environments.

Then, in one illustrative embodiment, an overall score function can then be expressed as:

$$score = w_c * (\Sigma_{k=0}^{n}(t_k r_k v_k) + c) + w_p * \Sigma_{k=0}^{n}(l_{(k-1,k)} + t_k)$$

where $w_c$ is the weight for cost and $w_p$ is the weight for performance.

Note that latency is captured only when functions are executing in different clusters, assuming intra-cluster latency is minimal or otherwise negligible and intra-cluster placement (worker node selection) is done by a scheduler local to the cluster.

It is further realized that an edge INFaaS implementation of a heuristic search, such as shown in FIG. 6, is performance-sensitive and should performed with as many iterations as possible within the shortest amount of time. However, it is also realized that there can be hundreds of child states generated for each state. Accordingly, illustrative embodiments provide a process to further accelerate the performance of one or more scheduling algorithms.

Figure 10:
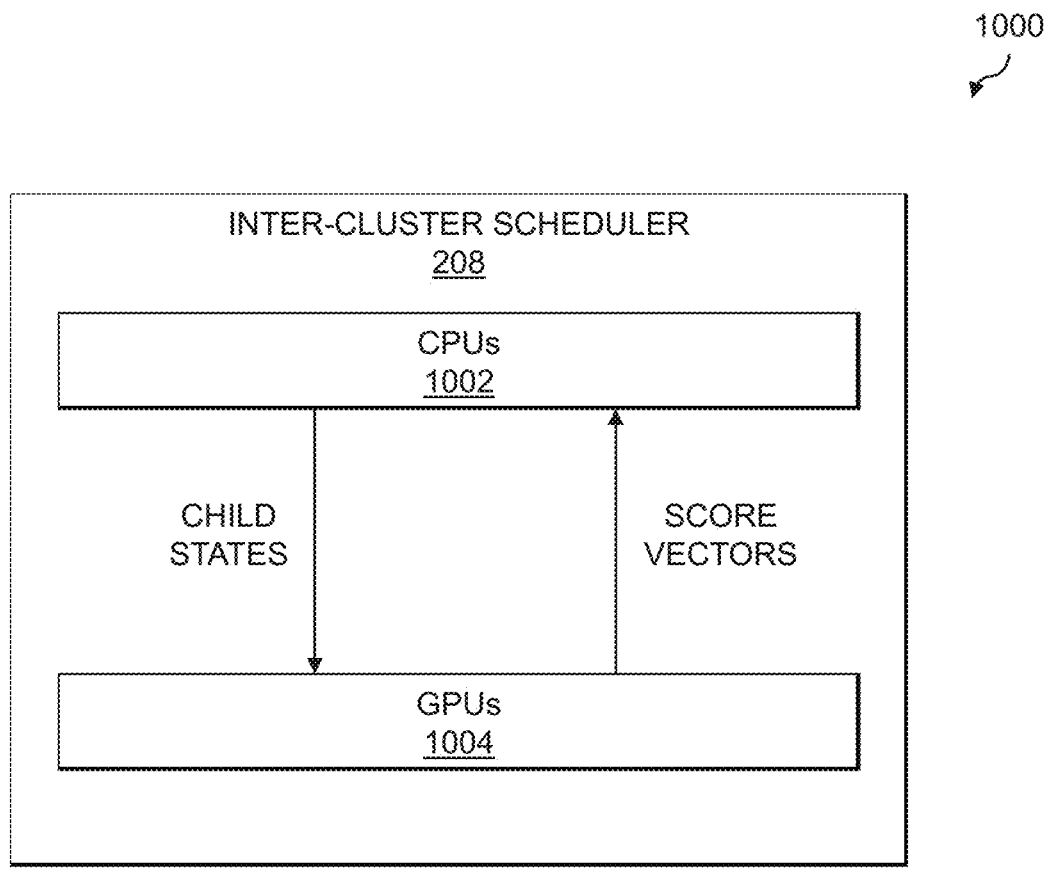
FIG. 10 illustrates an accelerator-assisted architecture for use in an inter-cluster scheduler with chain scheduling functionality according to an illustrative embodiment.

Rather than utilizing individual central processing unit (CPU) cores to calculate score functions and generate children for one state at a time, illustrative embodiments provide for multiple CPU threads to generate children for n states in parallel and utilize accelerators, such as graphic processing units (GPUs), to calculate scores for child states in a batch mode. Such an implementation in inter-cluster scheduler 208 is shown in architecture 1000 of FIG. 10, wherein (one or more) CPUs 1002 generate child states in parallel, and (one or more) GPUs 1004 calculate the scores in a batch mode.

In some embodiments, variables used to calculate a score are placed in vectors, and each child state is represented as a row of a data structure. At the conclusion of generating all children, the data structure is copied to the memory space of a GPU to perform vector operations using parallel floating point computations. One or more of CPUs 1002 can then dequeue the next best state in the sorted-queue (602 in FIG. 6 as explained in detail above), assuming the number of threads is higher than the number of cores available. The original thread is blocked waiting for the result from one or more of GPUs 1004. The scores are returned from GPUs 1004 in the form of score vectors. Then, the CPU thread of CPUs 1002 that sent the child state data structure awakens and inserts additional child states into sorted-queue 602, as explained above. Thus, such an accelerator-assisted architecture improves the efficiency of chain scheduling performed by inter-cluster scheduler 208.

Figure 11:
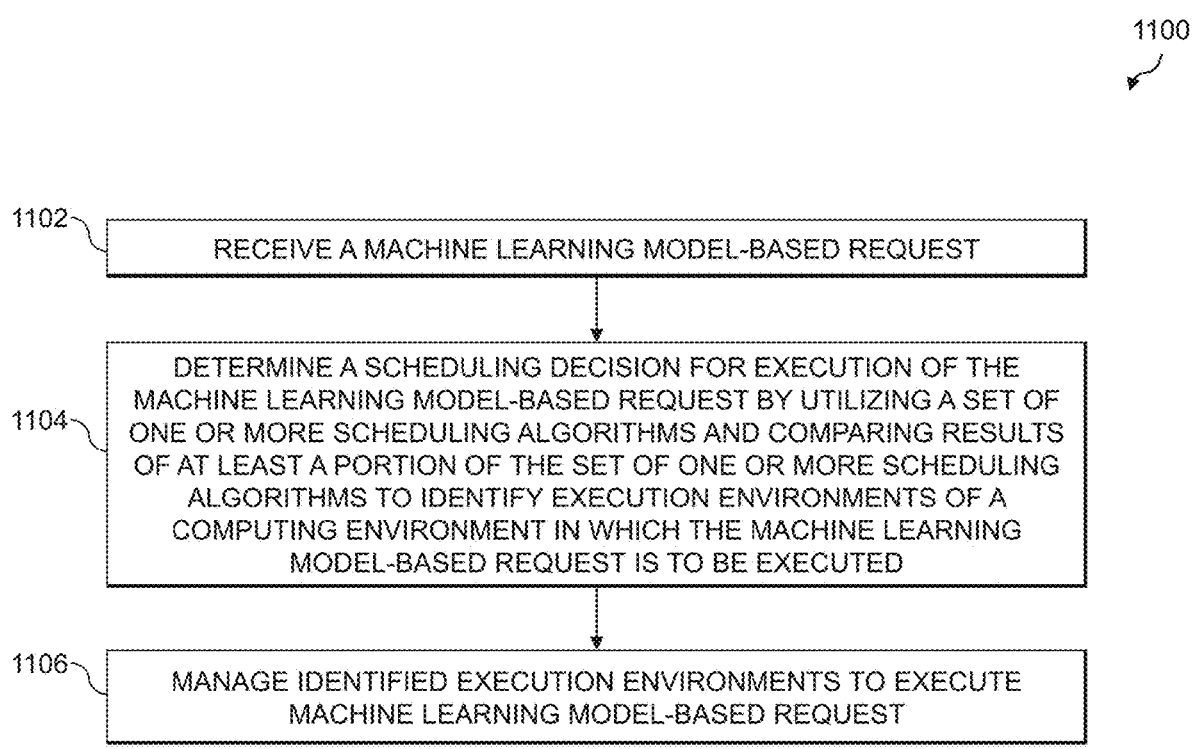
FIG. 11 illustrates a chain schedule management methodology for machine learning inference serving according to an illustrative embodiment.

Turning now to FIG. 11, a chain scheduling methodology 1100 for machine learning model-based processing functionality (e.g., inference serving) in a computing environment is shown. More particularly, step 1102 receives a machine learning model-based request. Step 1104 determines a scheduling decision for execution of the machine learning model-based request, wherein determining the scheduling decision further comprises utilizing a set of one or more scheduling algorithms and comparing results of at least a portion of the set of one or more scheduling algorithms to identify execution environments of a computing environment in which the machine learning model-based request is to be executed. Step 1106 manages the identified execution environments to execute the machine learning model-based request.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement chain schedule management functionalities will now be described in greater detail with reference to FIGS. 12 and 13. Although described in the context of computing environment 100, these platforms may also be used to implement at least portions of other information processing systems in other embodiments.

Figure 12:
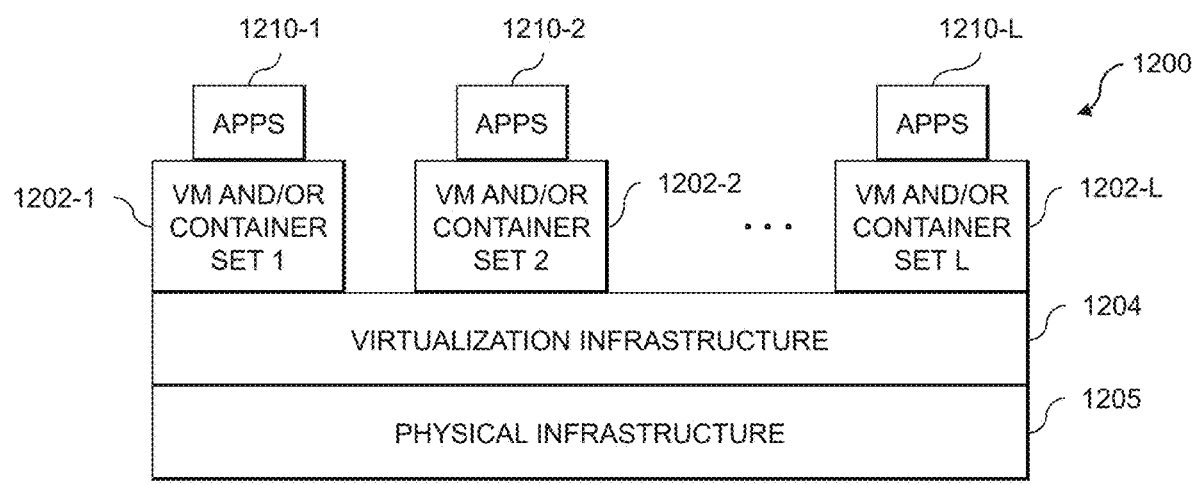
FIGS. 12 and 13 illustrate examples of processing platforms that may be utilized to implement at least a portion of an information processing system in illustrative embodiments.
Figure 13:
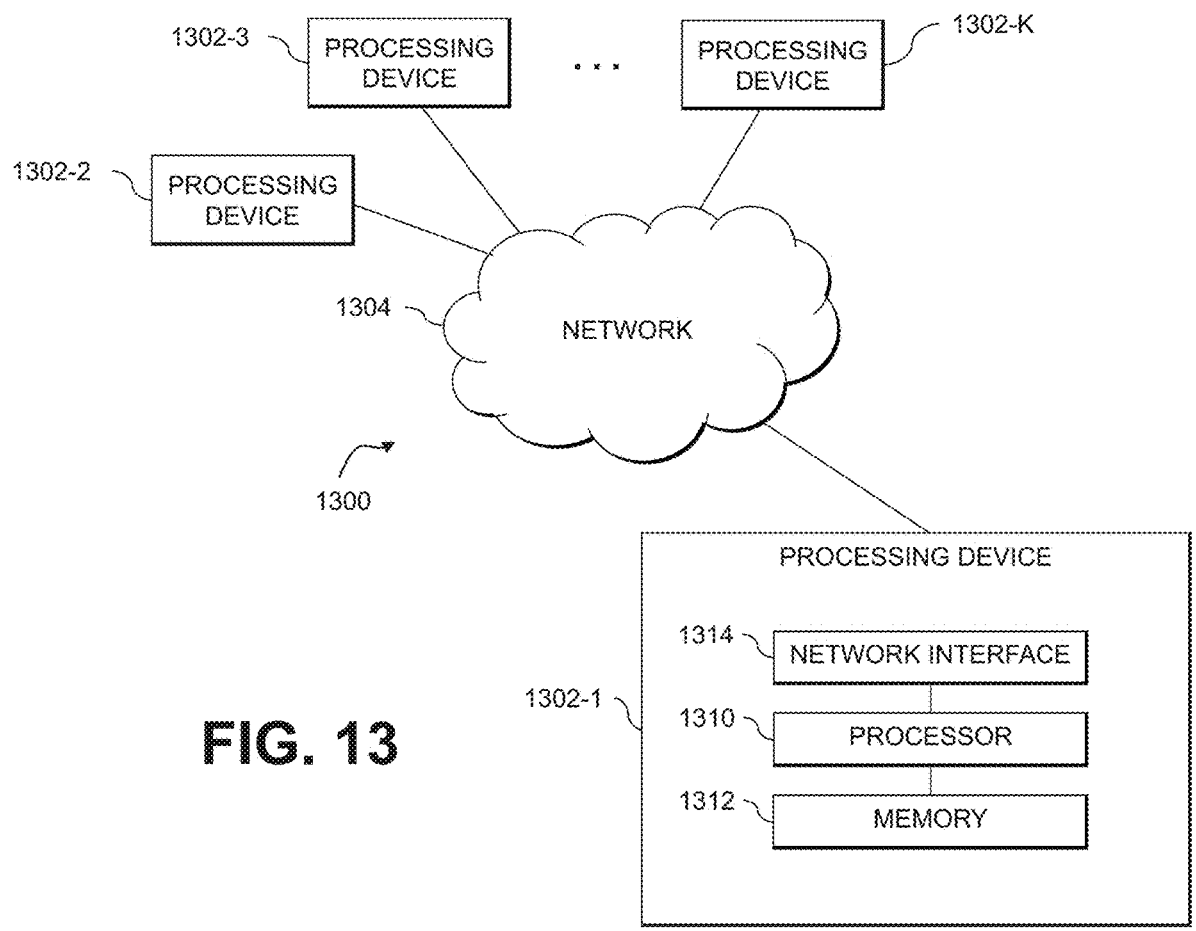

FIG. 12 shows an example processing platform comprising infrastructure 1200. The infrastructure 1200 comprises a combination of physical and virtual processing resources that may be utilized to implement at least a portion of computing environment 100 in FIG. 1. The infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of computing environment 100 may each run on a computer, server, storage device or other processing platform element. A given such element may be viewed as an example of what is more generally referred to herein as a "processing device." The infrastructure 1200 shown in FIG. 12 may represent at least a portion of one processing platform. Another example of such a processing platform is processing platform 1300 shown in FIG. 13.

The processing platform 1300 in this embodiment comprises a portion of computing environment 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and computing environment 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing virtualized computing resources as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hardware, fabric connections, services, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving a machine learning model-based request; and
   determining a scheduling decision for execution of the machine learning model-based request, wherein determining the scheduling decision further comprises utilizing a set of one or more scheduling algorithms and comparing results of at least a portion of the set of one or more scheduling algorithms to identify execution environments of a computing environment in which the machine learning model-based request is to be executed;
   wherein the receiving and determining steps are performed by at least one processor and at least one memory storing executable computer program instructions.

2. The method of claim 1, wherein the machine learning model-based request comprises an inference serving request.

3. The method of claim 1, wherein determining the scheduling decision further comprises determining that the machine learning model-based request warrants multiple functions to execute in a chain of multiple clusters of the computing environment.

4. The method of claim 3, wherein determining the scheduling decision further comprises identifying the chain of multiple clusters of the computing environment based on scoring values that represent one or more end-to-end metrics associated with execution of the multiple functions across the chain of multiple clusters.

5. The method of claim 4, wherein the scoring values represent one or more of an accuracy metric, a cost metric, and a performance metric.

6. The method of claim 4, wherein comparing results of at least a portion of the set of one or more scheduling algorithms to identify execution environments of a computing environment in which the machine learning model-based request is to be executed further comprises comparing the scoring values associated with the results of at least a portion of the set of one or more scheduling algorithms.

7. The method of claim 1, wherein at least one of the set of one or more scheduling algorithms is configured to perform a heuristic search.

8. The method of claim 7, wherein the heuristic search is configured to consider a given execution environment and one or more variations of the given execution environment when identifying execution environments of a computing environment in which the machine learning model-based request is to be executed.

9. The method of claim 8, wherein the heuristic search is configured to generate respective scoring values for the given execution environment and the one or more variations of the given execution environment.

10. The method of claim 9, wherein the respective scoring values are generated in at least one accelerator.

11. The method of claim 1, further comprising managing the identified execution environments to execute the machine learning model-based request.

12. The method of claim 1, wherein the at least one processor and the at least one memory comprise a node in a virtualized workload orchestration framework.

13. The method of claim 12, wherein the node is part of an edge computing platform.

14. An apparatus, comprising:
at least one processing platform comprising at least one processor coupled to at least one memory, the at least one memory storing computer program instructions wherein, the at least one processing platform, when executing the computer program instructions, is configured to:
receive a machine learning model-based request; and
determine a scheduling decision for execution of the machine learning model-based request, wherein determining the scheduling decision further comprises utilizing a set of one or more scheduling algorithms and comparing results of at least a portion of the set of one or more scheduling algorithms to identify execution environments of a computing environment in which the machine learning model-based request is to be executed.

15. The apparatus of claim 14, wherein the machine learning model-based request comprises an inference serving request.

16. The apparatus of claim 14, wherein determining the scheduling decision further comprises determining that the machine learning model-based request warrants multiple functions to execute in a chain of multiple clusters of the computing environment.

17. The apparatus of claim 16, wherein determining the scheduling decision further comprises identifying the chain of multiple clusters of the computing environment based on scoring values that represent one or more end-to-end metrics associated with execution of the multiple functions across the chain of multiple clusters.

18. A computer program product stored on a non-transitory computer-readable medium and comprising machine executable instructions, the machine executable instructions, when executed, causing a processing device to perform steps of:
receiving a machine learning model-based request; and
determining a scheduling decision for execution of the machine learning model-based request, wherein determining the scheduling decision further comprises utilizing a set of one or more scheduling algorithms and comparing results of at least a portion of the set of one or more scheduling algorithms to identify execution environments of a computing environment in which the machine learning model-based request is to be executed.

19. The computer program product of claim 18, wherein the machine learning model-based request comprises an inference serving request.

20. The computer program product of claim 18, wherein determining the scheduling decision further comprises:
determining that the machine learning model-based request warrants multiple functions to execute in a chain of multiple clusters of the computing environment; and
identifying the chain of multiple clusters of the computing environment based on scoring values that represent one or more end-to-end metrics associated with execution of the multiple functions across the chain of multiple clusters.

* * * * *